(12) United States Patent
Masuzawa et al.

(10) Patent No.: US 7,933,062 B2
(45) Date of Patent: Apr. 26, 2011

(54) ELECTROPHORETIC FLUID, ELECTROPHORETIC DISPLAY MEDIUM, ELECTROPHORETIC DISPLAY ELEMENT, AND ELECTROPHORETIC DISPLAY DEVICE

(75) Inventors: Masahiro Masuzawa, Chiba (JP); Takashi Kitamura, Chiba (JP)

(73) Assignees: Ricoh Company, Ltd., Tokyo (JP); Chiba University, Chiba-shi (JP)

( * ) Notice: Subject to any disclaimer, the term of this patent is extended or adjusted under 35 U.S.C. 154(b) by 82 days.

(21) Appl. No.: 12/375,459

(22) PCT Filed: May 29, 2008

(86) PCT No.: PCT/JP2008/060329
§ 371 (c)(1),
(2), (4) Date: Jan. 28, 2009

(87) PCT Pub. No.: WO2008/146950
PCT Pub. Date: Dec. 4, 2008

(65) Prior Publication Data
US 2009/0268274 A1 Oct. 29, 2009

(30) Foreign Application Priority Data

Jun. 1, 2007 (JP) .................................. 2007-147358
Feb. 7, 2008 (JP) .................................. 2008-027920

(51) Int. Cl.
*G02B 26/00* (2006.01)

(52) U.S. Cl. ........................................ 359/296; 345/107
(58) Field of Classification Search .................. 359/296
See application file for complete search history.

(56) References Cited

U.S. PATENT DOCUMENTS

| 6,930,818 | B1 | 8/2005 | Liang et al. |
| 2004/0032390 | A1* | 2/2004 | Liang et al. .................... 345/107 |
| 2004/0252361 | A1 | 12/2004 | Machida et al. |
| 2006/0202949 | A1* | 9/2006 | Danner et al. ................. 345/107 |
| 2007/0120814 | A1 | 5/2007 | Moriyama et al. |

FOREIGN PATENT DOCUMENTS

| JP | 2001 188269 | 7/2001 |
| JP | 2002 511607 | 4/2002 |
| JP | 2002 196376 | 7/2002 |
| JP | 2002 520655 | 7/2002 |
| JP | 2003 295235 | 10/2003 |
| JP | 2005 3964 | 1/2005 |
| JP | 3680996 | 5/2005 |

* cited by examiner

*Primary Examiner* — Ricky L Mack
*Assistant Examiner* — James C Jones
(74) *Attorney, Agent, or Firm* — Oblon, Spivak, McClelland, Maier & Neustadt, L.L.P.

(57) ABSTRACT

A disclosed electrophoretic fluid includes a solvent; and first, second, and third dispersible particles having different optical properties and dispersed in the solvent, the first dispersible particles being uncharged, the second dispersible particles being positively-charged electrophoretic particles, and the third dispersible particles being negatively-charged electrophoretic particles.

18 Claims, 9 Drawing Sheets

ELECTROPHORETIC FLUID, ELECTROPHORETIC DISPLAY MEDIUM, ELECTROPHORETIC DISPLAY ELEMENT, AND ELECTROPHORETIC DISPLAY DEVICE

CROSS-REFERENCE TO RELATED APPLICATIONS

This application is a U.S. national stage application of PCT/JP2008/060329 filed on May 29, 2008, now WO2008/146950 published Dec. 4, 2008.

TECHNICAL FIELD

The present invention generally relates to an electrophoretic fluid, an electrophoretic display medium, an electrophoretic display element, an electrophoretic display device, a display method, a production method of the electrophoretic display element, and a production method of the electrophoretic display device.

BACKGROUND ART

Cathode-ray tube (CRT) displays and liquid crystal displays are widely used to display text, images, videos, and so on. Although such display devices can quickly display digital data and rewrite displayed images, they are not suitable to carry around. Also, since such display devices are light-emitting devices, viewing displayed images for a long time strains the eyes. Further, those display devices cannot keep images displayed when turned off.

Meanwhile, to distribute or archive text and images as documents, they are printed on paper. Text and images printed on paper are called hard copies. Hard copies reflect multiply-scattered light and therefore have better visibility and are easier on the eyes compared with light-emitting devices. Also, hard copies are lightweight and easy to handle, and therefore can be read in any posture. However, hard copies become waste after use. Although a part of used hard copies can be recycled, recycling is labor-intensive and costly. Thus, hard copies have a disadvantage in terms of resource savings.

With the advancement of information technology, more and more information is being processed using computers, and we have more chances to read documents on a display. Against this backdrop, there is an increasing need for a paper-like display that has advantages of both an electronic display and a hard copy, i.e., that is rewritable and suitable for reading documents. As materials for a bright, reflective paper-like display with a memory capability, polymer-dispersed liquid crystals, bistable cholesteric liquid crystals, electrochromic elements, and electrophoretic display elements are drawing attention. Especially, a display using electrophoretic display elements has an advantage in terms of display quality and power consumption during operation.

In an electrophoretic display element, an electrophoretic display medium containing a dispersion liquid, which includes electrophoretic particles dispersed in a dispersion medium having a color different from that of the electrophoretic particles, is placed between a pair of transparent electrodes. The surfaces of the electrophoretic particles in the dispersion medium are electrically charged. When a voltage attracting the electric charge of the electrophoretic particles is applied to one of the transparent electrodes, the electrophoretic particles are attracted to and accumulate at the one of the transparent electrodes and, as a result, the color of the electrophoretic particles becomes observable. When a voltage repelling the electric charge of the electrophoretic particles is applied, the electrophoretic particles move to the other one of the transparent electrodes and, as a result, the color of the dispersion medium becomes observable. An electrophoretic display element displays a color using this mechanism.

To implement an image display device using electrophoretic display elements as described above, it is necessary to arrange a large number of electrophoretic display elements in a small area. For this purpose, a structure for arranging the electrophoretic display elements is necessary. For example, a honeycomb structure sheet, which is an aggregate of hollow structures, is suitable as an image display element structure used to arrange minute electrophoretic display elements. To produce an image display device using a honeycomb structure sheet, electrophoretic display elements each including electrophoretic particles and a dispersion medium are formed in the respective cells of the honeycomb structure.

Patent document 1 discloses an electrophoretic display and a method of producing the electrophoretic display. The disclosed electrophoretic display is produced by filling cup-like recesses, which are formed by micro-embossing or image exposure, with a dispersion of charged pigment particles dispersed in a solvent or a solvent blend; and by curing an overcoat layer over the dispersion to seal the dispersion in the recesses. The overcoat layer is made of a sealing composition that has a specific gravity smaller than that of the dispersion and is at least partly immiscible with the dispersion.

Patent documents 2 and 4 disclose a display using an electrophoretic liquid where three types of particles are dispersed for color display. Patent document 3 discloses a display using an electrophoretic liquid comprising electrophoretic particles and non-electrophoretic particles dispersed in a colored dispersion medium.

[Patent document 1] Japanese Patent No. 3680996
[Patent document 2] Japanese Patent Application Publication No. 2002-511607
[Patent document 3] Japanese Patent Application Publication No. 2001-188269
[Patent document 4] Japanese Patent Application Publication No. 2002-520655

As described above, various electrophoretic display methods and devices are proposed. Also, research is being conducted to develop color electrophoretic display methods and devices. In patent documents 2 and 4, a dispersion of three types of particles dispersed in a dispersion medium or a dispersion of two types of particles dispersed in a colored dispersion medium is used to implement a color display. However, although patent documents 2 and 4 disclose operations of displays, they do not disclose concrete examples of dispersed particles (their characteristics, materials, and production methods). Therefore, with the technologies disclosed in patent documents 2 and 4, it is difficult to produce a color electrophoretic display device.

DISCLOSURE OF THE INVENTION

Embodiments of the present invention provide an electrophoretic fluid, an electrophoretic display medium containing the electrophoretic fluid, an electrophoretic display element including the electrophoretic display medium, an electrophoretic display device including the electrophoretic display elements, and a display method of the electrophoretic display element that solve or reduce one or more problems caused by the limitations and disadvantages of the related art.

An embodiment of the present invention provides an electrophoretic fluid that includes a solvent; and first, second, and third dispersible particles having different optical properties and dispersed in the solvent, the first dispersible particles being uncharged, the second dispersible particles being positively-charged electrophoretic particles, and the third dispersible particles being negatively-charged electrophoretic particles.

Another embodiment of the present invention provides an electrophoretic display element. The electrophoretic display element includes an electrophoretic display medium having a hollow structure that contains an electrophoretic fluid including a solvent, and first, second, and third dispersible particles having different optical properties and dispersed in the solvent, the first dispersible particles being uncharged, the second dispersible particles being positively-charged electrophoretic particles, and the third dispersible particles being negatively-charged electrophoretic particles; a transparent first electrode; and second and third electrodes facing the first electrode across the electrophoretic display medium.

Still another embodiment of the present invention provides a display method of an electrophoretic display element that includes an electrophoretic display medium having a hollow structure containing an electrophoretic fluid including a solvent, and first, second, and third dispersible particles having different optical properties and dispersed in the solvent, the first dispersible particles being uncharged, the second dispersible particles being positively-charged electrophoretic particles, and the third dispersible particles being negatively-charged electrophoretic particles; a transparent first electrode; and second and third electrodes facing the first electrode across the electrophoretic display medium. The display method includes the step of applying a voltage between the first and second electrodes and/or between the first and third electrodes in order that the second dispersible particles or the third dispersible particles accumulate at the transparent first electrode in the electrophoretic display medium and become observable through the transparent first electrode.

BEST MODE FOR CARRYING OUT THE INVENTION

Figure 1:
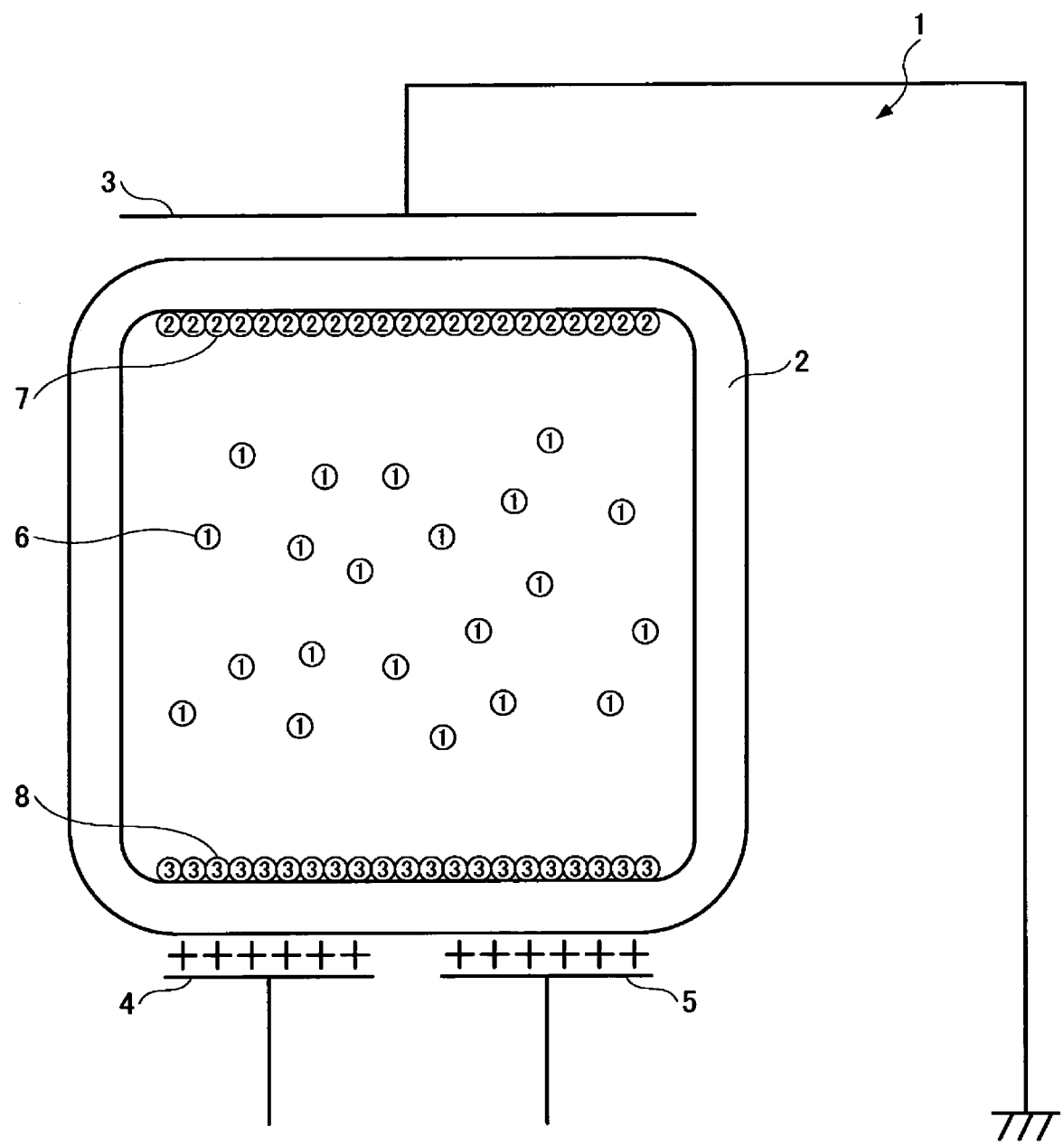
FIG. 1 is a first drawing illustrating operations of an electrophoretic display element.

Preferred embodiments of the present invention are described below with reference to the accompanying drawings.
<Electrophoretic Fluid>
An electrophoretic fluid according to an embodiment of the present invention is described below. An electrophoretic fluid of this embodiment comprises three types of dispersible particles dispersed in a solvent used as an electrophoretic medium. The three types of dispersible particles include first dispersible particles, second dispersible particles, and third dispersible particles having different optical properties and charge characteristics. The first dispersible particles are uncharged, the second dispersible particles are positively-charged electrophoretic particles, and the third dispersible particles are negatively-charged electrophoretic particles. Optical properties include colors such as black and white and their brightnesses.

Dispersible particles (may also be simply called "particles") usable for an electrophoretic fluid of this embodiment include organic and inorganic pigment particles with or without color. Pigment particles preferably have low solubility in a solvent used as the electrophoretic medium and are able to exist in the solvent as a disperse phase.

Examples of inorganic pigment particles include white lead, zinc white, lithopone, titanium dioxide, zinc sulfide, antimony oxide, calcium carbonate, kaolin, mica, barium sulphate, gross white, alumina white, talc, silica, calcium silicate, cadmium yellow, cadmium lithopone yellow, yellow iron oxide, titanium yellow, titanium barium yellow, cadmium orange, cadmium lithopone orange, molybdate orange, iron red, red lead, vermilion, cadmium red, cadmium lithopone red, umber, brown iron oxide, zinc iron chrome brown, chrome green, chromium oxide, viridian, cobalt green, cobalt chrome green, titanium cobalt green, iron blue, cobalt blue, ultramarine blue, cerulean blue, cobalt aluminum chrome blue, cobalt violet, mineral violet, carbon black, iron black, manganese ferrite black, cobalt ferrite black, copper chrome black, copper chrome manganese black, titanium black, aluminum powder, copper powder, lead powder, tin powder, and zinc powder.

Examples of organic pigment particles include fast yellow, disazo yellow, condensed azo yellow, anthrapyrimidine yellow, isoindoline yellow, copper azomethine yellow, quinophthalo yellow, benzimidazolone yellow, nickel dioxime yellow, monoazo yellow lake, dinitroaniline orange, pyrazolone orange, perinone orange, naphthol red, toluidine red, permanent carmine, brilliant fast scarlet, pyrazolone red, rhodamine 6G lake, permanent red, lithol red, bon lake red, lake red, brilliant carmine, Bordeaux 10B, naphthol red, quinacridone magenta, condensed azo red, naphthol carmine, perylene scarlet, condensed azo scarlet, benzimidazolone carmine, anthraquinonyl red, perylene red, perylene maroon, quinacridone maroon, quinacridone scarlet, quinacridone red, diketopyrrolopyrrole red, benzimidazolone brown, phthalocyanine green, victoria blue lake, phthalocyanine blue, fast sky blue, alkali blue toner, indanthrone blue, rhodamine B lake, methyl violet lake, dioxazine violet, and naphthol violet.

As organic pigment particles, polymer particles, especially, hollow polymer particles are preferable. Hollow polymer particles can be produced by known methods. For example, such methods are disclosed in "New Development of Particulate Polymer" (Toray Research Center, Inc.), "Microporous Polymer and Development in its Application" (Toray Research Center, Inc.), and "Latest Technology and Application of Polymer Microparticles" (CMC Publishing Co., Ltd.). Methods for producing hollow polymer particles include, but are not limited to, emulsion polymerization, seed emulsion polymerization, soap-free polymerization, dispersion polymerization, a combination of suspension polymerization and foaming, a combination of seed polymerization and foaming, a combination of seed polymerization and polymerization shrinkage, suspension polymerization of W/O/W emulsion, spray drying of liquid droplets, and seed coagulation where polymer emulsion is coagulated by adding solid electrolyte particles.

Known polymer materials that are not soluble in a transparent dispersion medium may be used for hollow organic-polymer particles. Such polymer materials include styrene, styrene-acrylate, styrene-isoprene, divinyl benzene, methyl methacrylate, methacrylate, ethyl methacrylate, ethyl acrylate, n-butyl acrylate, acrylic acid, acrylonitrile, acrylate-methacrylate, ethylene, ethylene-acrylic acid, nylon, silicone, urethane, melamine, benzoguanamine, phenol, fluorine (tetrachloroethylene), vinylidene chloride, vinylnaphthalene, vinylcarbazole, quaternary pyridinium salt, synthetic rubber, cellulose, cellulose acetate, chitosan, calcium alginate, and materials prepared by cross-linking the above polymer materials to improve the solvent resistance. Hollow particles made of the above organic polymers may be dyed as necessary.

Pigment particles may be composed of pigments only or may be surface-modified. Normal surface modification methods for pigment particles may be used for this purpose. For example, surface modification of pigment particles may be performed by coating the surface of a pigment with a chemical compound such as a polymer, by coupling using a coupling agent such as titanate or silane, or by graft polymerization. Also, pigment particles prepared by mechanochemical treatment may be used. For example, a composite particle of different pigment particles, a composite particle of a pigment particle and a polymer particle or a hollow polymer particle, and a composite particle of a pigment particle and a resin may be used.

The diameter of the above particles may be determined in relation to a solvent used as the dispersion medium. In terms of dispersibility and electrophoretic mobility, the diameter of particles is preferably, but not limited to, between 0.01 and 100 µm.

As the material for the first dispersible particles having no or zero electric charge, polyvinylnaphthalene is preferable. Microparticles of polyvinylnaphthalene may be prepared by dispersion polymerization of vinylnaphthalene in a silicone oil, which is a nonpolar solvent, using a silicone macromonomer as a dispersing agent. Alternatively, particles prepared by coating titanium oxide with polyvinylnaphthalene or particles of polyvinyl carbazole may be used as the first dispersible particles. However, materials for the first dispersible particles of this embodiment are not limited to those described above.

Preferable materials for the second dispersible particles having a positive electric charge include surface-modified carbon black, phthalocyanine pigment, quinacridone pigment, and monoazo pigment. These pigments are preferably surface-modified by graft polymerization of the 2-ethylhexyl group. However, materials for the second dispersible particles of this embodiment are not limited to those described above.

Preferable materials for the third dispersible particles having a negative electric charge include surface-modified carbon black, titanium black, phthalocyanine pigment, quinacridone pigment, and monoazo pigment. These pigments are preferably surface-modified by heterocoagulation of a polymer having a carboxyl group. Or, these pigments may be surface-modified by graft polymerization of the lauryl group. However, materials of the third dispersible particles of this embodiment are not limited to those described above.

Examples of solvents usable as the dispersion medium of the electrophoretic fluid of this embodiment include, but are not limited to, aromatic hydrocarbons such as benzene, toluene, xylene, phenylxylylethane, diisopropylnaphthalene, and naphthenic hydrocarbon; aliphatic hydrocarbons such as hexane, dodecylbenzene, cyclohexane, kerosene, and paraffinic hydrocarbon; halogenated hydrocarbons such as chloroform, trichloroethylene, tetrachloroethylene, trifluoroethylene, tetrafluoroethylene, dichloromethane, and ethyl bromide; phosphoric esters such as tricresyl phosphate, trioctyl phosphate, octyldiphenyl phosphate, and tricyclohexyl phosphate; phthalate esters such as dibutyl phthalate, dioctyl phthalate, dilauryl phthalate, and dicyclohexyl phthalate; carboxylate esters such as butyl oleate, diethyleneglycol dibenzoate, dioctyl sebacate, dibutyl sebacate, dioctyl adipate, trioctyl trimellitate, acetyl triethyl citrate, octyl maleate, dibutyl maleate, and ethyl acetate; and others such as isopropylbiphenyl, isoamylbiphenyl, chlorinated paraffin, diisopropylnaphthalene, 1,1-ditolylethane, 1,2-ditolylethane, 2,4-ditertiary aminophenol, and N,N-dibutyl-2-butoxy-5-tert-octyl aniline. The above organic solvents may be used individually or in combination. Among the above solvents, paraffinic hydrocarbon is especially preferable as the dispersion medium of the electrophoretic fluid of this embodiment.

In addition to charged and uncharged dispersible particles, the electrophoretic fluid of this embodiment may contain additives used, for example, to control the amount of surface charge or to improve the dispersibility of the dispersible particles. Examples of additives include, but are not limited to, surfactants and protective colloids.

As the surfactants, ionic surfactants including nonionic surfactants, anionic surfactants, cationic surfactants, and ampholytic surfactants, which are soluble or dispersible in a solvent of the electrophoretic fluid, may be used. The above surfactants may be used individually or in combination. Examples of surfactants are listed below, but other surfactants may also be used.

Nonionic Surfactants:
- Polyoxyalkylene alkylphenol ethers such as polyoxyethylene nonylphenol ether, polyoxyethylene dinonylphenol ether, polyoxyethylene octylphenol ether, polyoxyethylene styrenated phenol, polyoxyethylene bisphenol A, polyoxyethylene nonylphenyl ether, polyoxyethylene octylphenyl ether, and nonylphenol ethoxylate-
- Polyoxyalkylene ethers such as polyoxyethylene caster oil, polyoxyalkylene block polymer, polyoxyethylene cetyl ether, polyoxyethylene lauryl ether, polyoxyethylene oleyl ether, polyoxyethylene stearyl ether, and polyoxypropylene ether
- Glycols such as monool type polyoxyalkylene glycol, diol type polyoxyalkylene glycol, triol type polyoxyalkylene glycol, monool block type polyalkylene glycol, diol block type polyalkylene glycol, and random type polyalkylene glycol
- Alkyl alcohol ethers such as primary linear alcohol ethoxylates including octylphenol ethoxylate, oleyl alcohol ethoxylate, and lauryl alcohol ethoxylate; secondary linear alcohol ethoxylates; and polyphenol ethoxylates
- Polyoxyalkylene alkyl esters such as polyoxyethylene rosin ester, polyoxyethylene lauryl ester, polyoxyethylene oleyl ester, and polyoxyethylene stearyl ester
- Sorbitan fatty acid esters such as sorbitan monolaurate, sorbitan monopalmitate, sorbitan monostearate, sorbitan dilaurate, sorbitan dipalmitate, sorbitan distearate, sorbitan sesquilaurate, sorbitan sesquipalmitate, and sorbitan sesquistearate
- Polyoxyethylene sorbitan esters such as polyoxyethylene sorbitan monolaurate, polyoxyethylene sorbitan monopalmitate, polyoxyethylene sorbitan monostearate, polyoxyethylene sorbitan dilaurate, polyoxyethylene sorbitan dipalmitate, polyoxyethylene sorbitan distearate, polyoxyethylene sorbitan sesquilaurate, polyoxyethylene sorbitan sesquipalmitate, and polyoxyethylene sorbitan sesquistearate Fatty acid esters such as saturated fatty acid methyl ester, unsaturated fatty acid methyl ester, saturated fatty acid butyl ester, unsaturated fatty acid butyl ester, saturated fatty acid stearyl ester, unsaturated fatty acid stearyl ester, saturated fatty acid octyl ester, unsaturated fatty acid octyl ester, stearic acid polyethylene glycol ester, oleic acid polyethylene glycol ester, and rosin polyethylene glycol ester Fatty acids such as stearic acid, oleic acid, palmitic acid, lauric acid, and myristic acid; and their amides Polyoxyethylene alkyl amines such as polyoxyethylene lauryl amine, polyoxyethylene alkyl amine, and polyoxyethylene alkyl amine ether Higher fatty acid monoethanolamides such as lauric acid monoethanolamide and coconut fatty acid diethanolamide; higher fatty acid diethanolamides; and amide compounds such as polyoxyethylene stearic acid amide, coconut diethanolamide (1-2 type or 1-1 type), and alkyl alkylol amide; and alkanol amides Alkanol amines represented by the following formulas:

R—(CH2CH2O)mH(CH2CH2O)nH and

R—NH—C3H6-NH2

(R represents oleyl, octyl, dodecyl, tetradecyl, hexadecyl, octadecyl, coconut oil, tallow, soybean oil, or the like)

Primary amines represented by the following formula:

R—NH2

(R represents oleyl, octyl, dodecyl, tetradecyl, hexadecyl, octadecyl, coconut oil, tallow, soybean oil, or the like)

Secondary amines represented by the following formula:

R1R2-NH (R1 and R2 each independently represents oleyl, octyl, dodecyl, tetradecyl, hexadecyl, octadecyl, coconut oil, tallow, soybean oil, or the like.)

Tertiary amines represented by the following formula:

R1R2R3N (R1, R2, and R3 each independently represents oleyl, octyl, dodecyl, tetradecyl, hexadecyl, octadecyl, coconut oil, tallow, soybean oil, or the like.)

Synthesized higher alcohols and natural higher alcohols

Polymers and oligomers such as acrylic acid compounds, polycarboxylic acid compounds, hydroxyfatty acid oligomers, and derivatives of hydroxyfatty acid oligomers Anionic Surfactants:

Carboxylic acid salts such as polycarboxylic acid type polymer activator, polycarboxylic acid type nonionic activator, special fatty acid soap, and rosin soap Alcohol sulfuric ester salts such as caster oil sulfuric ester salt, sodium salt of lauryl alcohol sulfuric ester, amine salt of lauryl alcohol sulfuric ester, sodium salt of natural alcohol sulfuric ester, and sodium salt of higher alcohol sulfuric ester Sulfuric ester salts such as amine salt of lauryl alcohol ether sulfuric ester, sodium salt of lauryl alcohol ether sulfuric ester, amine salt of synthesized higher alcohol ether sulfuric ester, sodium salt of synthesized higher alcohol ether sulfuric ester, amine salt of alkylpolyether sulfuric ester, sodium salt of alkylpolyether sulfuric ester, amine salt of natural alcohol ethylene oxide adduct sulfuric ester, sodium salt of natural alcohol ethylene oxide adduct sulfuric ester, amine salt of synthetic alcohol ethylene oxide adduct sulfuric ester, sodium salt of synthetic alcohol ethylene oxide adduct sulfuric ester, amine salt of alkyl phenol ethylene oxide adduct sulfuric ester, sodium salt of alkyl phenol ethylene oxide adduct sulfuric ester, amine salt of polyoxyethylene nonylphenyl ether sulfuric ester, sodium salt of polyoxyethylene nonylphenyl ether sulfuric ester, amine salt of polyoxyethylene polyphenyl ether sulfuric ester, and sodium salt of polyoxyethylene polyphenyl ether sulfuric ester Sulfonic acid salts such as amine salts of alkylarylsulfonic acid, sodium salts of alkylarylsulfonic acid, amine salt of naphthalenesulfonic acid, sodium salt of naphthalenesulfonic acid, amine salts of alkylbenzenesulfonic acid, sodium salts of alkylbenzenesulfonic acid, naphthalenesulfonic acid condensate, and naphthalenesulfonic acid formalin condensate Polyoxyalkylene sulfonic acid salts such as amine salt of polyoxyethylene nonylphenyl ether sulfonic acid, sodium salt of polyoxyethylene nonylphenyl ether sulfonic acid, amine salt of polyoxyethylene special aryl ether sulfonic acid, sodium salt of polyoxyethylene special aryl ether sulfonic acid, amine salt of polyoxyethylene tridecylphenyl ether sulfonic acid, sodium salt of polyoxyethylene tridecylphenyl ether sulfonic acid, amine salt of polyoxyethylene alkyl ether sulfonic acid, and sodium salt of polyoxyethylene alkyl ether sulfonic acid Sulfosuccinic ester salts such as amine salt of dialkyl sulfosucinate, sodium salt of dialkyl sulfosucinate, amine salt of polyphenylpolyethoxy sulfosuccinate, sodium salt of polyphenylpolyethoxy sulfosuccinate, amine salt of polyoxyethylene alkyl ether sulfosuccinic monoester, and sodium salt of polyoxyethylene alkyl ether sulfosuccinic monoester Phosphoric esters and phosphates such as alkyl phosphoric ester, alkoxyalkyl phosphoric ester, higher alcohol phosphoric ester, higher alcohol phosphate, alkylphenol phosphoric ester, aromatic phosphoric ester, polyoxyalkylene alkyl ether phosphoric ester, and polyoxyalkylene alkylaryl ether phosphoric ester Cationic Surfactants:

Alkyltrimethyl amine quaternary ammonium salts represented by the following formula:

R—N(CH3)3X (R represents stearyl, cetyl, lauryl, oleyl, dodecyl, coconut oil, soybean oil, tallow, or the like, and X represents halogen, amine, or the like.)

Quaternary ammonium salts such as tetramethylamine salt and tetrabutylamine salt Acetates represented by the following formula:

(RNH3)(CH3COO)

(R represents stearyl, cetyl, lauryl, oleyl, dodecyl, coconut oil, soybean oil, tallow, or the like.)

Benzylamine quaternary ammonium salts such as lauryldimethylbenzyl ammonium salt (haloid salt, amine salt, or the like), stearyldimethylbenzyl ammonium salt (haloid salt, amine salt, or the like), and dodecyldimethylbenzyl ammonium salt (haloid salt, amine salt, or the like)

Polyoxyalkylene quaternary ammonium salts represented by the following formula:

R(CH3)N(C2H4O)mH(C2H4O)n.X (R represents stearyl, cetyl, lauryl, oleyl, dodecyl, coconut oil, soybean oil, tallow, or the like, and X represents halogen, amine, or the like.)

Amphoteric Surfactants:
  Betaine surfactants, imidazoline surfactants, β-alanine surfactants, and polyoctylpolyaminoethyl glycine hydrochloride As a protective colloid, any known protective colloid that is soluble or dispersible in the dispersion medium of the electrophoretic fluid may be used.

<Electrophoretic Display Medium>

An electrophoretic display medium of this embodiment contains an electrophoretic fluid as described above in a hollow structure at least one side of which is transparent. Normally, the electrophoretic display medium of this embodiment has a microstructure. An electrophoretic display element is produced by providing the electrophoretic display medium with electrodes for causing charged dispersible particles to migrate.

According to an embodiment of the present invention, the electrophoretic display medium is implemented by using a microcapsule as a hollow structure for containing the electrophoretic liquid. Microcapsules may be prepared, for example, by an in-situ method, interfacial polymerization, or coacervation. Examples of materials for the microcapsules include polyurethane, polyurea, polyurea-polyurethane, urea-formaldehyde resin, melamine-formaldehyde resin, polyamide, polyester, polysulfonamide, polycarbonate, polysulfinate, epoxy resin, acrylate, methacrylate, vinyl acetate, and gelatin. The diameter of the microcapsules is preferably between 30 and 200 μm. Microcapsules in the above diameter range are preferable as components of electrophoretic display elements.

According to another embodiment of the present invention, a honeycomb structure is used as hollow structures. A honeycomb structure is suitable to implement an electrophoretic display device comprising multiple electrophoretic display media or elements. Each cell of the honeycomb structure is used as an electrophoretic display medium. For example, electrophoretic display media may be created by injecting an electrophoretic fluid into cells of a resinous honeycomb structure formed by photolithography on a substrate and sealing the cells with a resin that is insoluble in the electrophoretic fluid. Thus, an aggregate of electrophoretic display media can be formed by filling the cells of the honeycomb structure with the electrophoretic fluid. Examples of resins for the honeycomb structure include polyurethane, polyurea, polyurea-polyurethane, urea-formaldehyde resin, melamine-formaldehyde resin, polyamide, polyester, polysulfonamide, polycarbonate, polysulfinate, epoxy resin, acrylate, methacrylate, vinyl acetate, gelatin, and photoresists made from polymethylmethacrylate, novolac resin, or polystyrene. Examples of resins for sealing the cells include polyurethane, polyurea, polyurea-polyurethane, urea-formaldehyde resin, melamine-formaldehyde resin, polyamide, polyester, polysulfonamide, polycarbonate, polysulfinate, epoxy resin, acrylate, methacrylate, vinyl acetate, and gelatin. To seal the cells, for example, a film of resin is formed over the electrophoretic fluid by applying and drying the resin with a coater such as a slit coater. A surfactant may be added to the resin used for sealing the cells to make it easier to form a film over the electrophoretic fluid. The wall thickness of each cell is preferably between 0.5 and 20 μm, the depth of each cell is preferably between 30 and 200 μm, and the pitch between the cells is preferably between 30 and 200 μm.

<Electrophoretic Display Element>

An electrophoretic display element according to an embodiment of the present invention is implemented by providing the electrophoretic display medium of the above embodiment with electrodes. Unlike a related art electrophoretic display element, an electrophoretic display element 1 of this embodiment includes three electrodes. As shown in FIG. 1, the electrophoretic display element 1 includes a transparent first electrode 3, a second electrode 4 facing the first electrode 3 across an electrophoretic display medium 2, and a third electrode 5 facing the first electrode 3 across the electrophoretic display medium 2. A side (first electrode side) of the electrophoretic display element 1 on which the first electrode 3 is placed is used as a display surface. Accordingly, the second and third electrodes 4 and 5 are disposed opposite to the display surface. The first electrode 3 is, for example, implemented by a transparent conductive thin film of ITO, $SnO_2$, or ZnO/Al. For the second and third electrodes 4 and 5, a thin-film transistor that has a switching function and is able to apply an electric field is preferably used.

<Electrophoretic Display Device>

Figure 4:
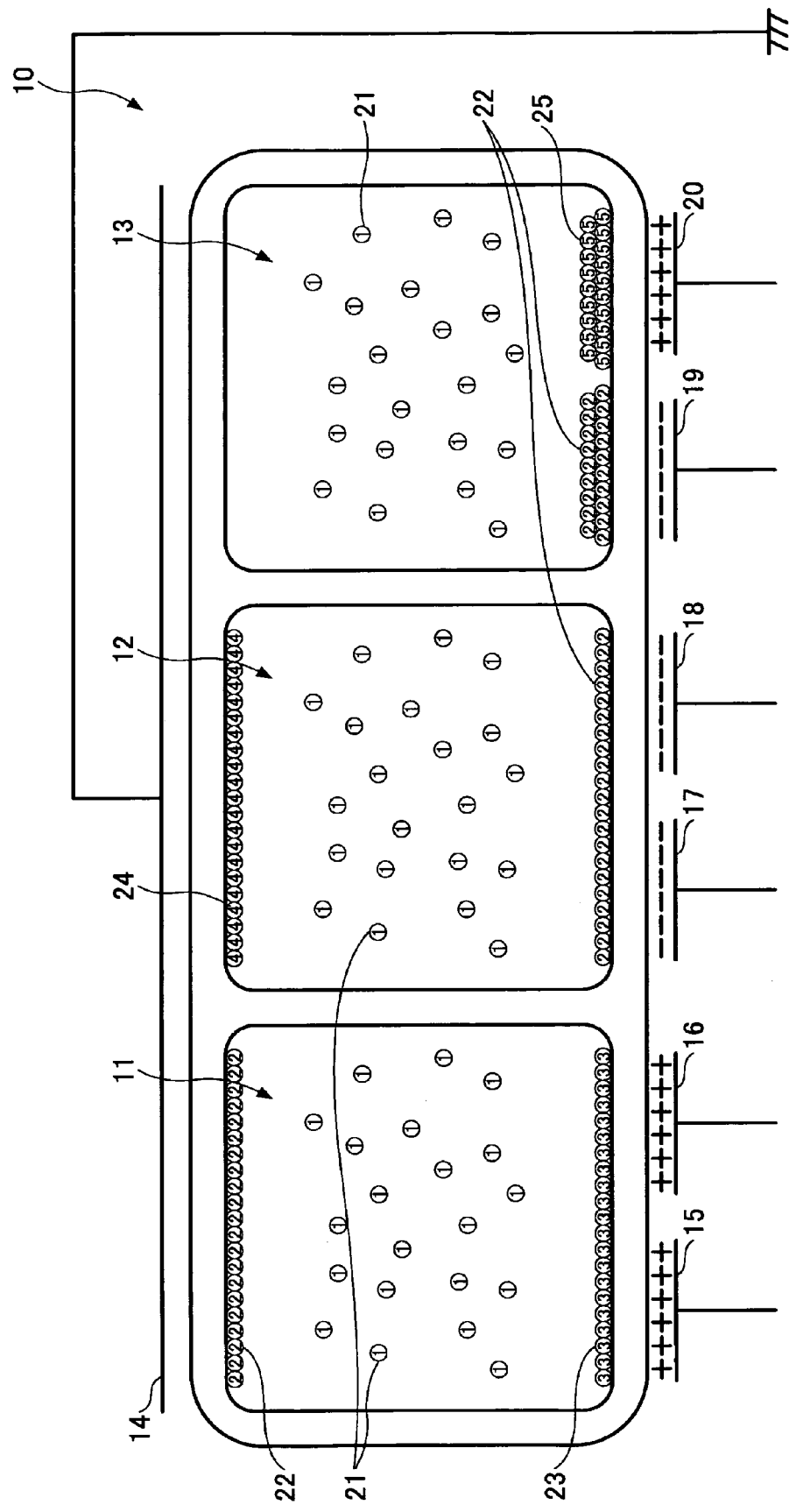
FIG. 4 is a drawing illustrating operations of a multicolor electrophoretic display device.

An electrophoretic display device according to an embodiment of the present invention is implemented by arranging multiple electrophoretic display elements. The electrophoretic display elements of the electrophoretic display device are disposed such that their first electrode sides (or the first electrodes) face substantially the same direction. FIG. 4 shows an electrophoretic display device 10 of this embodiment. For descriptive purposes, only three electrophoretic display elements are shown in FIG. 4. However, the number of electrophoretic display elements is not limited. In this example, a common first electrode 14 is provided for the three electrophoretic display elements, and second electrodes 15, 17, and 19 and third electrodes 16, 18, and 20 are provided for the respective electrophoretic display elements so that voltages can be applied independently. In the electrophoretic display device 10, the first electrode sides of the electrophoretic display elements are arranged in the same plane so that dispersible particles in the electrophoretic display elements can be observed from the upper side of FIG. 4. The electrophoretic display device 10 may be supported by a substrate (not shown) made of, for example, glass or resin.

Figure 5:
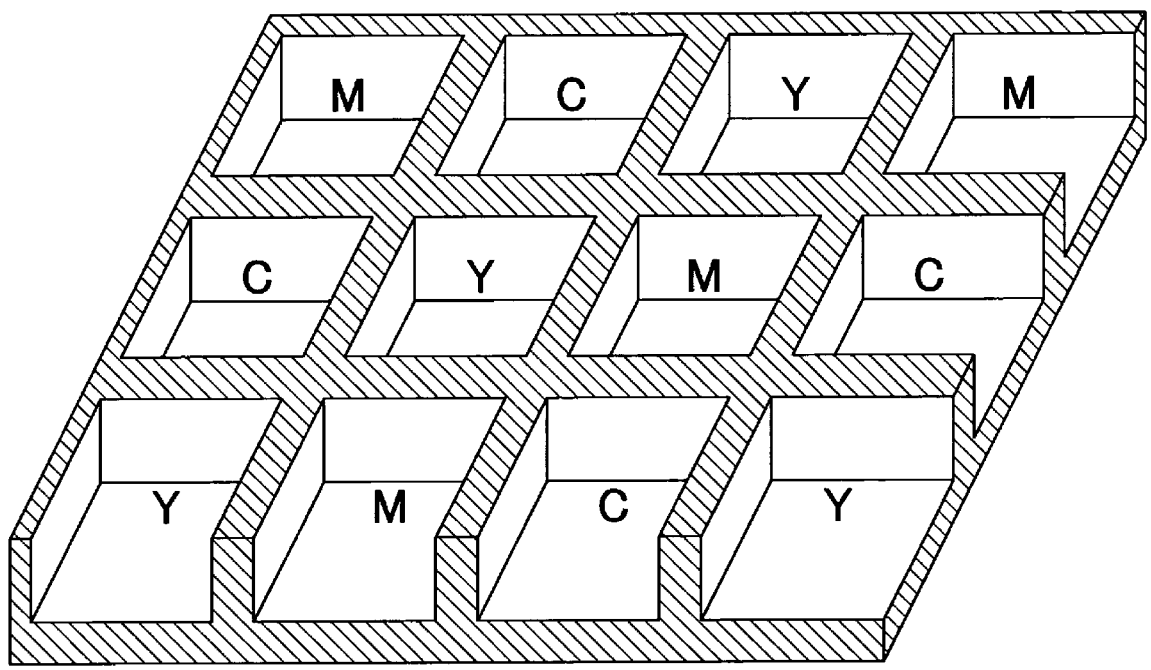
FIG. 5 is a drawing illustrating a first exemplary arrangement of electrophoretic display elements of different colors.
Figure 6:
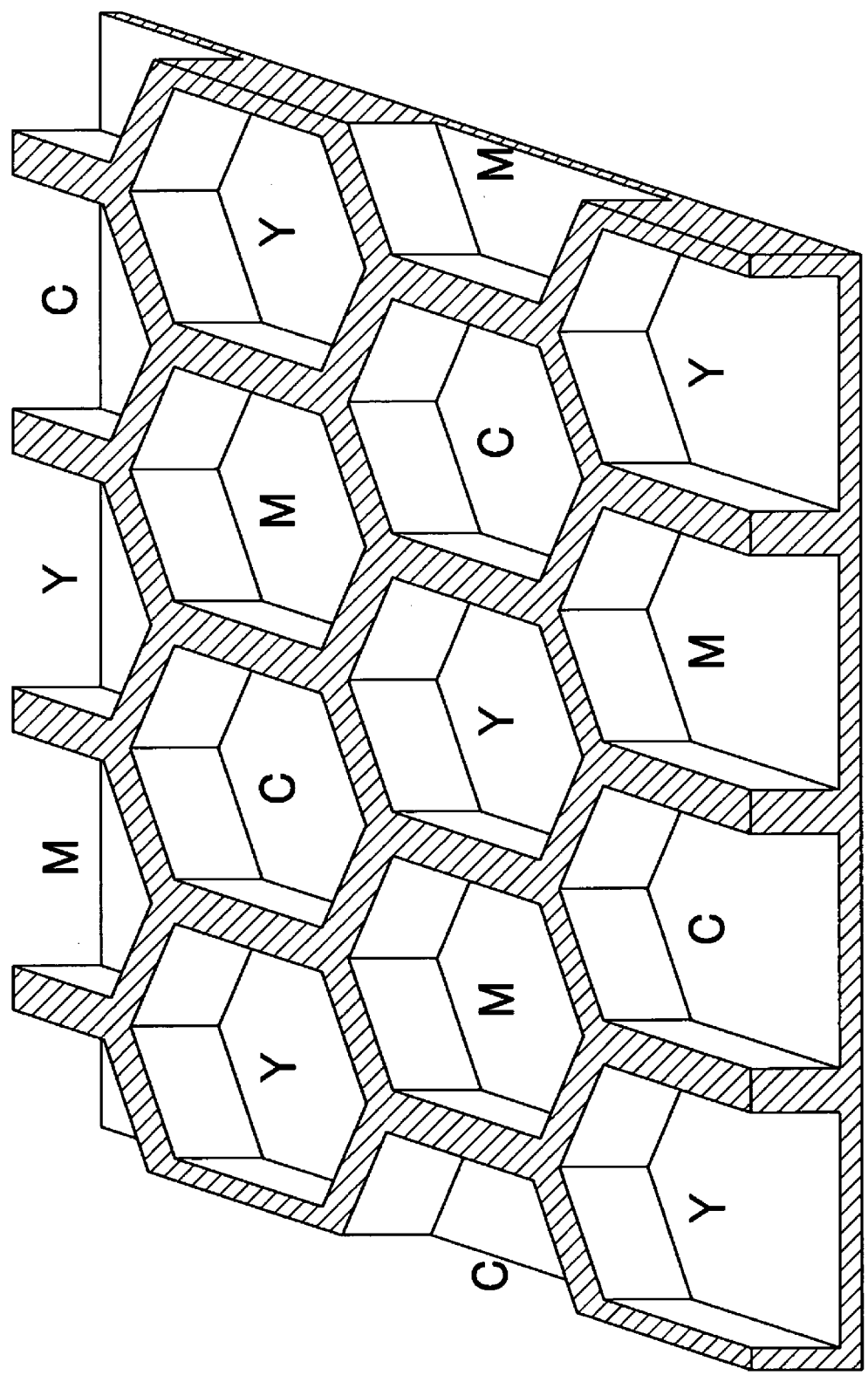
FIG. 6 is a drawing illustrating a second exemplary arrangement of electrophoretic display elements of different colors.

Electrophoretic display elements of the electrophoretic display device 10 of this embodiment are preferably arranged using a honeycomb structure where cells are arranged next to each other. Especially, a honeycomb structure like a tetragonal lattice as shown in FIG. 5 or a honeycomb structure like a hexagonal close-packed structure as shown in FIG. 6 are preferable. For example, as shown in FIGS. 5 and 6, when producing a multicolor electrophoretic display device, cells of a honeycomb structure are assigned to electrophoretic display media of three different colors: yellow (Y), magenta (M), and cyan (C). The electrophoretic display media of the three colors are preferably arranged such that the display media of the same color do not adjoin each other. In other words, at least one type of dispersible particles in an electrophoretic display element of the electrophoretic display device preferably has an optical property that is different from the optical properties of all types of dispersible particles in an adjacent electrophoretic display element. For example, an electrophoretic display medium of an electrophoretic display element may contain one of three types of electrophoretic fluids: an electrophoretic fluid including dispersible particles of white, black, and yellow; an electrophoretic fluid including dispersible particles of white, black, and magenta; and an electrophoretic fluid including dispersible particles of white, black, and cyan. In this case, electrophoretic display elements containing the same type of electrophoretic fluid are preferably arranged apart from each other. In this embodiment, it is assumed that the first dispersible particles are white, the second dispersible particles are yellow, magenta, or cyan, and the third dispersible particles are black. White dispersible particles are preferably made of polymer particles, especially, hollow polymer particles, and black dispersible particles are preferably made of carbon particles.

<Display Method of Electrophoretic Display Device>

In the electrophoretic display element 1, when a voltage is applied between the first and second electrodes 3 and 4 and/or between the first and third electrodes 3 and 5, the second or third dispersible particles accumulate at the first electrode 3 in the electrophoretic display medium 2 and become observable through the transparent electrode (the first electrode 3). When a voltage is applied between the second and third electrodes 4 and 5 and not to the first electrode 3, the second and third dispersible particles accumulate at the second and third electrodes 4 and 5 in the electrophoretic display medium 2, and as a result, the first dispersible particles in the electrophoretic display medium 2 become observable through the transparent electrode (the first electrode 3).

Figure 2:
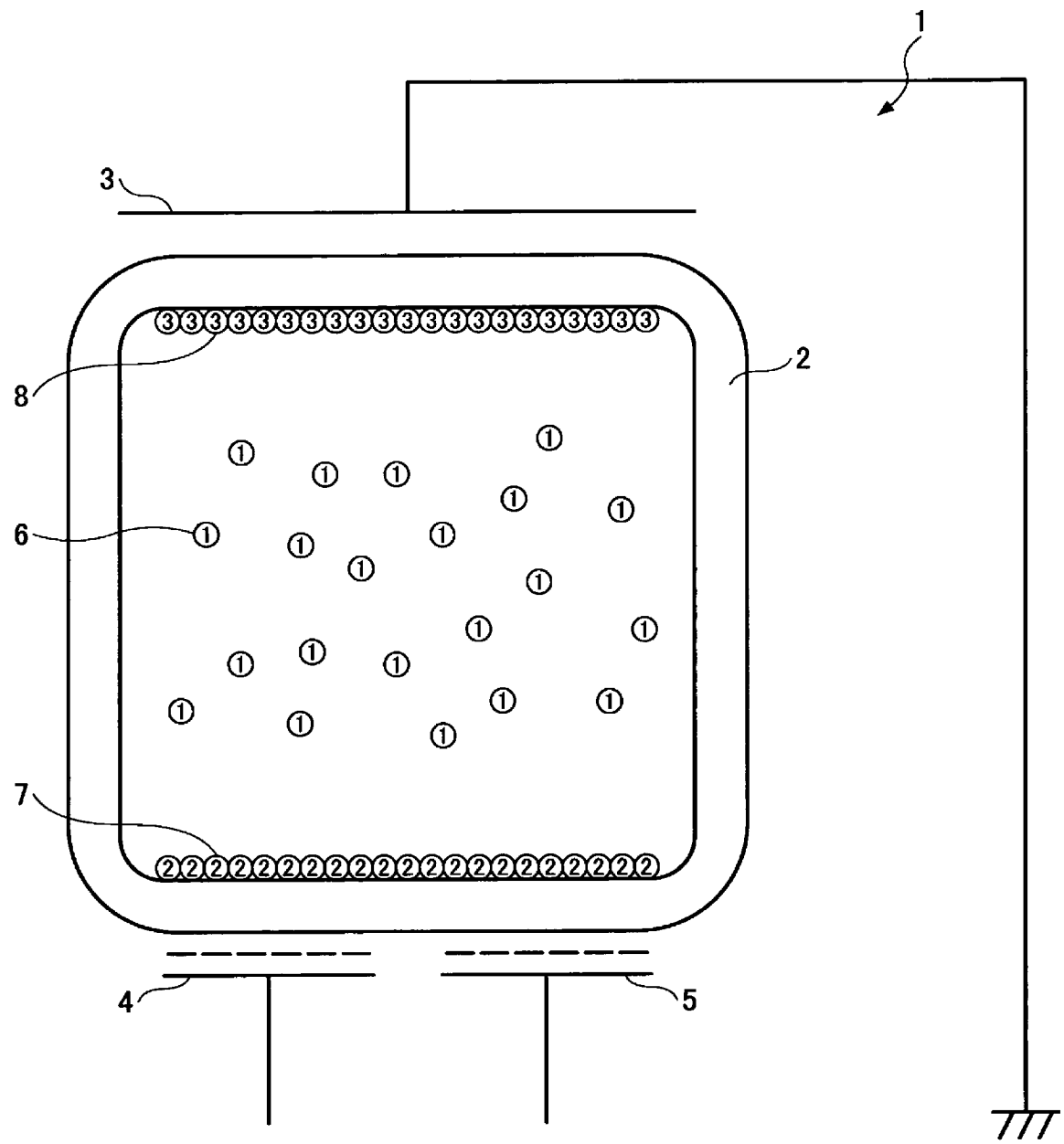
FIG. 2 is a second drawing illustrating operations of an electrophoretic display element.
Figure 3:
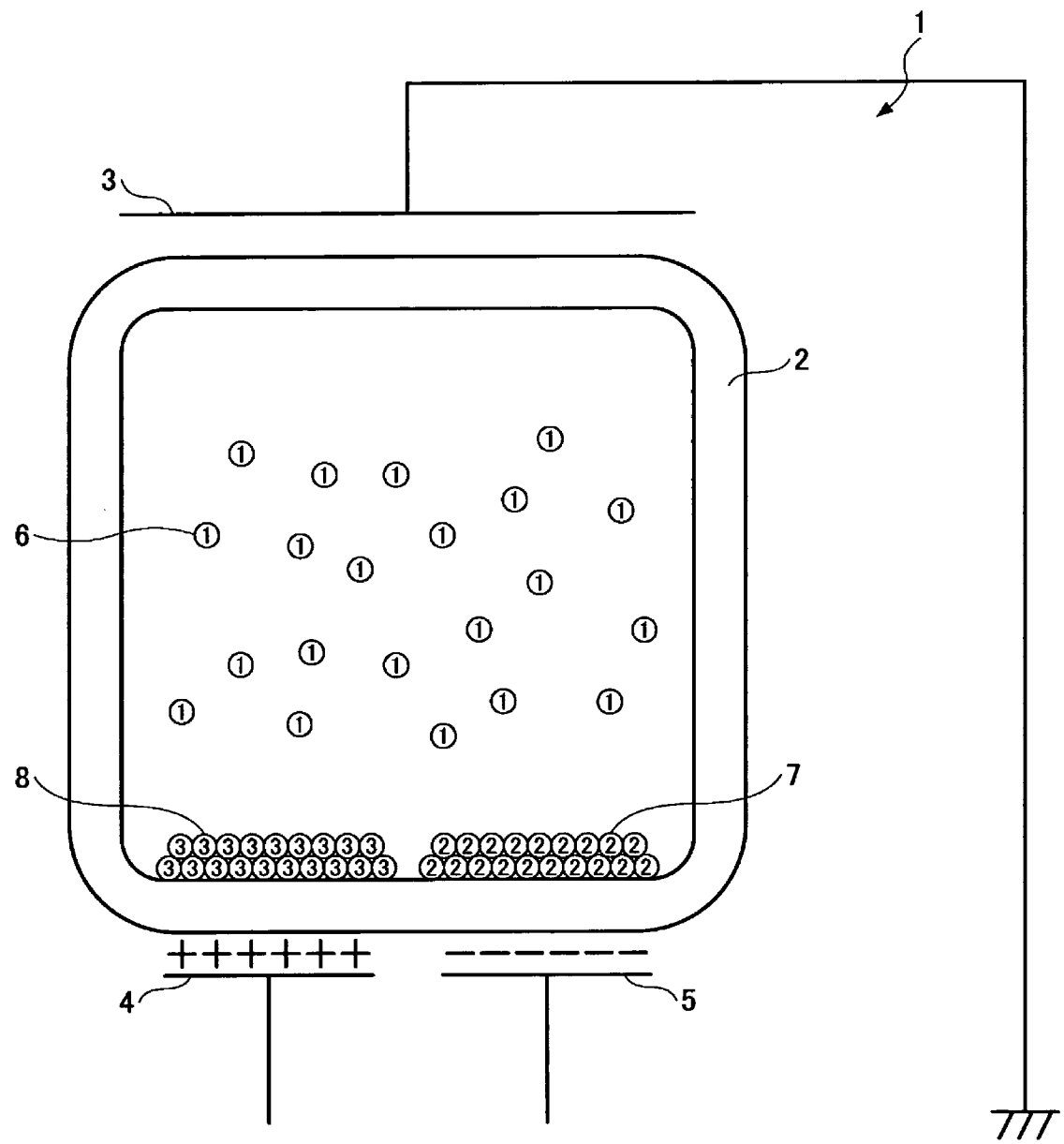
FIG. 3 is a third drawing illustrating operations of an electrophoretic display element.

An exemplary display method of the electrophoretic display element 1 is described in more detail with reference to FIGS. 1, 2, and 3. In FIGS. 1 through 3, first particles 6 are uncharged, second particles 7 are positively charged, and third particles 8 are negatively charged. When a positive voltage is applied to the second electrode 4 and the third electrode 5 relative to the first electrode 3, the positively-charged second particles 7 are attracted to the first electrode 3 and the negatively-charged third particles 8 are attracted to the second and third electrodes 4 and 5. As a result, the second particles 7 can be observed from an observation point above the first electrode 3 (see FIG. 1).

When a negative voltage is applied to the second electrode 4 and the third electrode 5 relative to the first electrode 3, the third particles 8 are attracted to the first electrode 3 and the second particles 7 are attracted to the second and third electrodes 4 and 5. As a result, the third particles 8 can be observed from the observation point (see FIG. 2).

When a positive voltage is applied to the second electrode 4 and a negative voltage is applied to the third electrode 5, the third particles 8 are attracted to the second electrode 4 and the second particles 7 are attracted to the third electrode 5. As a result, the first particles 6 dispersed in the electrophoretic fluid can be observed from the observation point (see FIG. 3).

Thus, an embodiment of the present invention makes it possible to display three different colors with one electrophoretic display element. For example, when the first particles are white, the second particles are black, and the third particles are magenta, the electrophoretic display element can display white, black, and magenta. Similarly, white, black, and yellow or white, black, and cyan can be displayed with one electrophoretic display element.

Accordingly, a full-color display device can be implemented using three different types of electrophoretic display elements. In FIG. 4, electrophoretic display elements 11, 12, and 13 each contains white particles 21 and black particles 22, and also contains one of yellow particles 23, magenta particles 24, and cyan particles 25 as the third dispersible particles. The first electrode 14 is shared by the electrophoretic display elements 11, 12, and 13, and the second electrodes 15, 17, and 19 and the third electrodes 16, 18, and 20 are provided for the respective electrophoretic display elements 11, 12, and 13. The second electrodes 15, 17, and 19 and the third electrodes 16, 18, and 20 can be controlled independently. Each of the electrophoretic display elements 11, 12, and 13 can display white, black, or one of yellow, magenta, and cyan according to voltages applied to the electrodes as described above.

Unlike related art color display devices that use four types (yellow, magenta, cyan, and black) of display elements to display a color image, an electrophoretic display device according to the above display method can display a color image using three types of electrophoretic display elements each of which can display white, black, and one of yellow, magenta, and cyan. Also, with the display method of this embodiment where all electrophoretic display elements can display black and white, it is possible to display a clear color image with no blur.

<Production Method of Electrophoretic Display Device>

An exemplary production method of an electrophoretic display device according to an embodiment of the present invention is described below. As described above, the first electrode of the electrophoretic display element may be implemented by a transparent, conductive thin film of ITO, $SnO_2$, or ZnO/Al. The conductive thin film is formed on a transparent glass substrate or a transparent film substrate of, for example, polyethylene terephthalate (PET) by sputtering, vacuum evaporation, chemical vapor deposition (CVD), or an application method. The glass substrate or the film substrate on which the first electrode is formed is used as a display surface of the electrophoretic display element of this embodiment.

For the second and third electrodes of the electrophoretic display element, a pair of thin-film transistors, each of which has a switching function and is able to apply an electric field, are preferably used. The pairs of thin-film transistors are preferably arranged in a tetragonal lattice or a hexagonal close-packed array on a glass substrate or a film substrate of, for example, PET. The distance between the pairs of thin-film transistors is preferably between 30 and 200 µm.

Next, cells for containing the electrophoretic fluid of this embodiment are formed in positions corresponding to the pairs of second and third electrodes by, for example, photolithography. For example, a photoresist resin is applied to the surface of the substrate on which the second and third electrodes are formed, and parts of the photoresist resin corresponding to the pairs of second and third electrodes are removed to form openings. The thickness of walls between cells (or openings) is preferably between 0.5 and 20 µm, the depth of cells (or the thickness of the photoresist resin) is preferably between 30 and 200 µm, and the pitch between cells is preferably between 30 and 200 µm. Then, the cells are filled with an electrophoretic fluid of this embodiment and are sealed with a resin that is not soluble in the electrophoretic fluid. Examples of resins for sealing the cells include polyurethane, polyurea, polyurea-polyurethane, urea-formaldehyde resin, melamine-formaldehyde resin, polyamide, polyester, polysulfonamide, polycarbonate, polysulfinate, epoxy resin, acrylate, methacrylate, vinyl acetate, and gelatin. For example, one of the above resins is applied over the electrophoretic fluid with a coater such as a slit coater and is dried to form a film. A surfactant may be added to the resin used for sealing the cells to make it easier to form a film over the electrophoretic fluid. The resin film sealing the cells is bonded to the glass substrate or the film substrate on which the first electrode is formed. As a result, multiple electrophoretic display elements are created.

The cells may be filled with different types of electrophoretic fluids to implement a multicolor electrophoretic display device. To inject different types of electrophoretic fluids into adjoining cells, an inkjet method may be used.

Figure 7A:
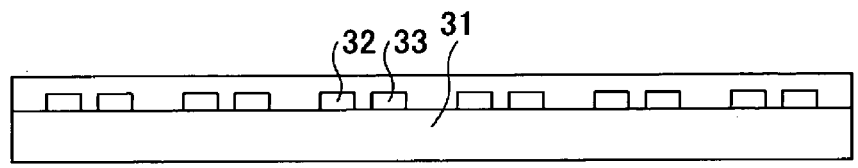
FIGS. 7A through 7D are drawings illustrating a method of assembling an electrophoretic display device.
Figure 7B:
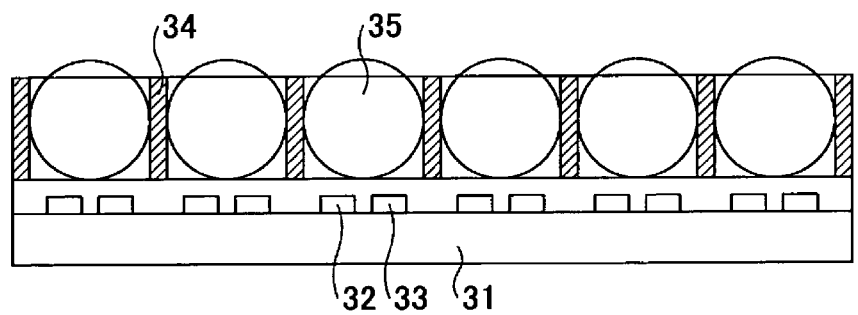
Figure 7C:
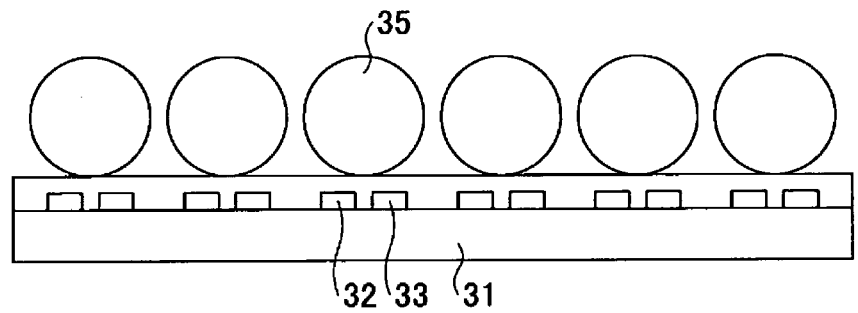
Figure 7D:
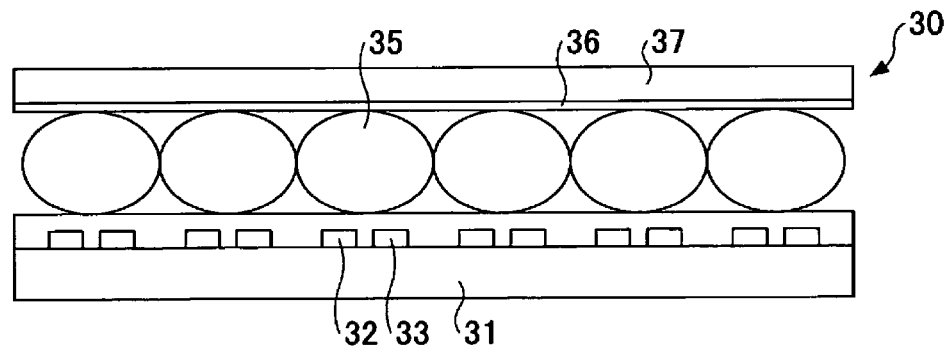

Another exemplary production method of an electrophoretic display device according to an embodiment of the present invention is described below with reference to FIG. 7. First, a substrate with the first electrode and a substrate with the second and third electrodes are prepared as described above. FIG. 7A shows a substrate 31 on which pairs of second and third electrodes 32 and 33 are formed. In FIG. 7B, microcapsules 35 containing an electrophoretic fluid of this embodiment are placed in positions corresponding to the pairs of the second and third electrodes 32 and 33. The microcapsules 35 may be prepared as described above. The diameter of the microcapsules 35 is preferably between 30 and 200 μm. A sheet having openings in positions corresponding to the pairs of the second and third electrodes 32 and 33 is used to align the microcapsules and the electrodes. In this step, the openings of the sheet and the pairs of the second and third electrodes 32 and 33 are aligned, an adhesive is applied to the second and third electrodes 32 and 33, and the microcapsules 35 are placed in the openings. As shown in FIG. 7C, the microcapsules 35 are bonded to the corresponding pairs of the electrodes even after the sheet is removed. Then, as shown in FIG. 7D, a first electrode 36 formed on a transparent substrate 37 is bonded to the microcapsules 35 placed on the pairs of the second and third electrodes 32 and 33. As a result, an electrophoretic display device is produced.

Figure 8A:
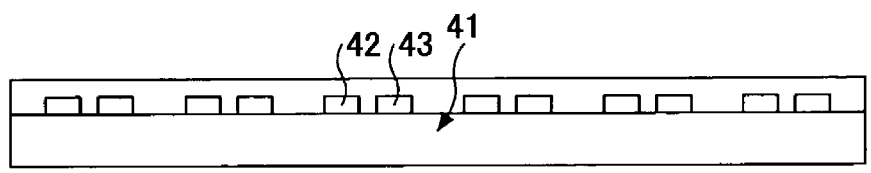
FIGS. 8A through 8F are drawings illustrating another method of assembling an electrophoretic display device.
Figure 8B:
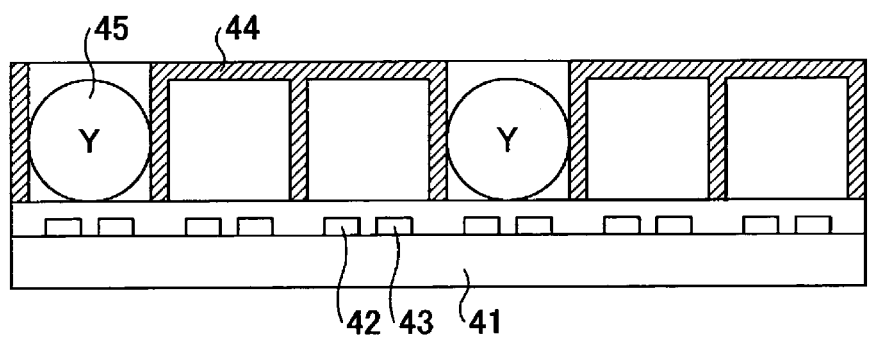
Figure 8C:
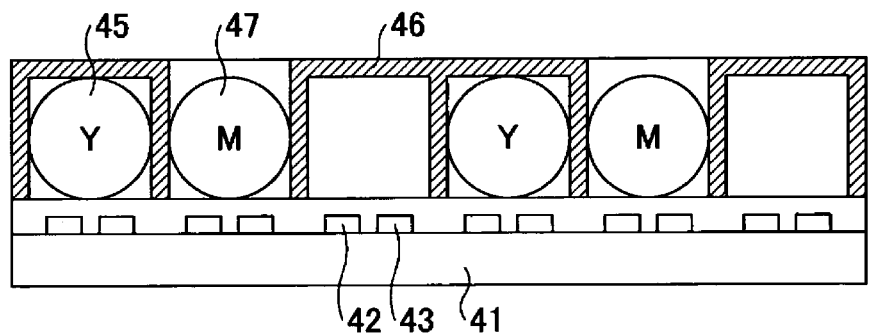
Figure 8D:
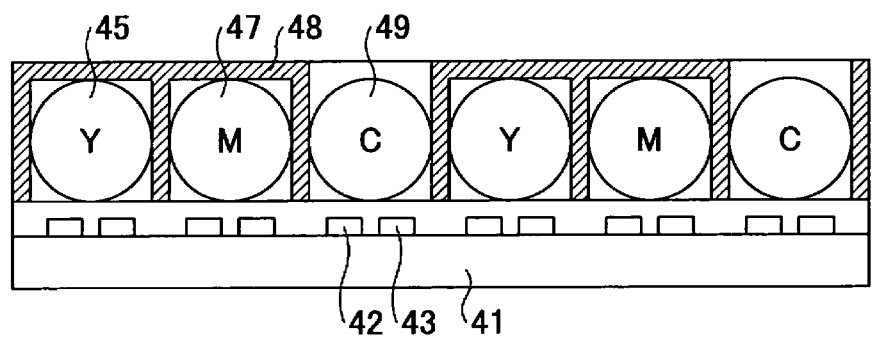
Figure 8E:
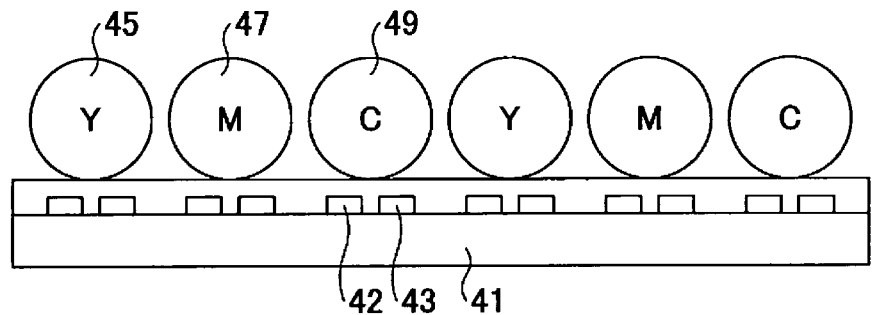
Figure 8F:
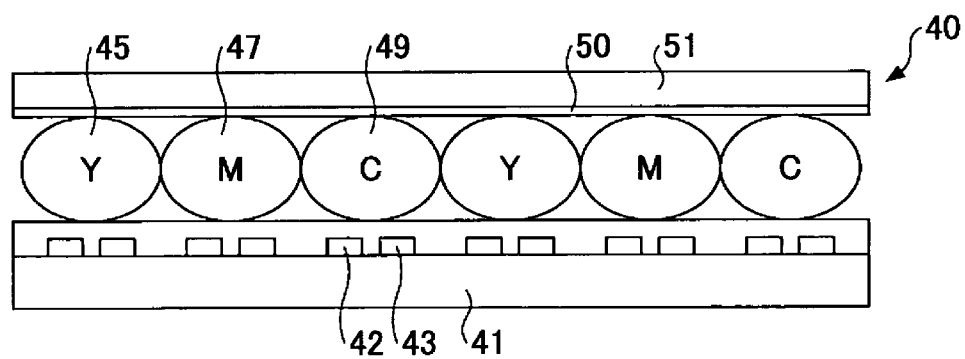

An exemplary production method of a multicolor electrophoretic display device according to an embodiment of the present invention is described below with reference to FIG. 8. In this case, adjoining microcapsules of the multicolor electrophoretic display device contain different types of electrophoretic fluids. In this method, sheets having openings in different positions are used to place microcapsules containing different electrophoretic fluids in their corresponding positions. For example, sheets 44, 46, and 48 having, respectively, first, second, and third opening patterns are prepared. The first, second, and third opening patterns correspond, respectively, to microcapsules 45, 47, and 49 containing first, second, and third electrophoretic fluids. In other words, the openings of the sheets 44, 46, and 48 correspond, respectively, to three types of electrophoretic display elements. FIG. 8A shows a substrate 41 on which pairs of second and third electrodes 42 and 43 are formed. In FIG. 8B, the microcapsules 45 of a first color are bonded to the corresponding pairs of the second and third electrodes 42 and 43 using the sheet 44 with the first opening pattern. In FIG. 8C, after the sheet 44 is removed, the microcapsules 47 of a second color are bonded to the corresponding pairs of the second and third electrodes 42 and 43 next to the microcapsules 45 using the sheet 46 with the second opening pattern. In FIG. 8D, after the sheet 46 is removed, the microcapsules 49 of a third color are bonded to the corresponding pairs of the second and third electrodes 42 and 43 next to the microcapsules 45 and 47 using the sheet 48 with the third opening pattern. Subsequent steps illustrated by FIGS. 8E and 8F are substantially the same as those described above with reference to FIGS. 7C and 7D. Thus, a multicolor electrophoretic display device of this embodiment is produced by arranging microcapsules containing different electrophoretic fluids next to each other.

EXAMPLE 1

Electrophoretic Fluid Containing White, Black, and Yellow Particles

An electrophoretic fluid containing white, black, and yellow particles was prepared as described below. In this example, polyvinyl naphthalene was used for the white particles, black toner was used for the black particles, and yellow toner was used for the yellow particles. Microparticles of polyvinyl naphthalene were prepared by dispersion polymerization of 2-vinylnaphthalene in Isopar G (aisoparaffin hydrocarbon of Exxon Mobil Corporation) using a silicone macromonomer as a dispersing agent. Polyvinyl naphthalene has good dispersion stability in Isopar G. The zeta potential indicating the amount of electric charge of the prepared microparticles was close to zero and the microparticles did not migrate in an electric field. As the black toner for the black particles, E233 of Fuji Xerox Co., Ltd. was used. The black particles were negatively charged. As the yellow toner for the yellow particles, G200-00 of Ricoh Company, Ltd. was used. The yellow particles were positively charged. An electrophoretic fluid was prepared by mixing the above particles in ratios shown in table 1 below.

TABLE 1

| Isopar G | 61.5 wt % |
| --- | --- |
| Polyvinyl naphthalene | 28.5 wt % |
| Black toner | 5 wt % |
| Yellow toner | 5 wt % |

EXAMPLE 2

Electrophoretic Display Device Capable of Displaying White, Black, and Yellow

Microcapsules containing the electrophoretic fluid of Example 1 are prepared. The microcapsules are prepared by coacervation of gelatin-gum arabic. The sizes of the microcapsules are adjusted to between 40 and 50 μm by separation. Then, pairs of second and third electrodes are formed on a PET film. The pairs of the second and third electrodes are arranged in a hexagonal close-packed array with a pitch of 60 μm between them. An adhesive is applied to the second and third electrodes, and a sheet having openings arranged in a hexagonal close-packed array and corresponding to the pairs of the second and third electrodes is placed on the PET film such that the openings are aligned with the pairs of the second and third electrodes. The microcapsules are applied to the sheet and are thereby put in the openings. After excess microcapsules are removed, the sheet is removed. As a result, the microcapsules remain on the corresponding pairs of electrodes. Then, an adhesive is applied to the microcapsules, and a PET film on which an ITO electrode is formed is bonded to the microcapsules. As a result, an electrophoretic display device capable of displaying three colors is produced. When bonding the PET film to the microcapsules, it is preferable to apply pressure to the PET film to an extent that the microcapsules are not damaged. This makes it possible to eliminate gaps between the microcapsules. Electrophoretic display elements of the produced electrophoretic display device display yellow when a voltage of +100 V is applied to the second and third electrodes relative to the ITO electrode, display black when a voltage of −100 V is applied to the second and third electrodes, and display white when a voltage of +50 V is applied to the second electrodes and a voltage of −50 V is applied to the third electrodes.

EXAMPLE 3

Electrophoretic Fluid Containing White, Black, and Magenta Particles (1)

An electrophoretic fluid containing white, black, and magenta particles was prepared as described below. In this example, polyvinyl naphthalene was used for the white particles, carbon black was used for the black particles, and quinacridon particles were used for the magenta particles. Microparticles of polyvinyl naphthalene were prepared by dispersion polymerization of 2-vinylnaphthalene in Isopar G (isoparaffin hydrocarbon of Exxon Mobil Corporation) using a silicone macromonomer as a dispersing agent. Polyvinyl naphthalene has good dispersion stability in Isopar G. The zeta potential indicating the amount of electric charge of the prepared microparticles was close to zero and the microparticles did not migrate in an electric field. The carbon black was surface-modified to charge it negatively. The surface of the carbon black was modified with an amino group by silane coupling. The surface of the carbon black was further modified by heterocoagulation of polymer microparticles formed by polymerization of a pigment dispersant with a carboxyl group, methyl methacrylate, and methacrylic acid. The surface-modified carbon black shows a negative charge characteristic because of the carboxyl group in the polymer microparticles. Actually, the zeta potential of the prepared black particles was negative and migration of the black particles in an electric field was observed. The quinacridon particles were surface-modified to charge them positively. As the quinacridon particles, PR-122 of Dainichiseika Color & Chemicals Mfg. Co., Ltd. was used. The surfaces of the quinacridon particles were diazo-coupled with 2-vinylaniline and graft-polymerized with 2-ethylhexyl methacrylate. The graft chain was charge-controlled using a surfactant. Specifically, the graft-polymerized quinacridon particles were dispersed in Isopar G, and Solsperse 17000 (Avecia) was added as a surfactant to the dispersion. In the dispersion, the zeta potential of the quinacridon particles was positive and migration of the quinacridon particles in an electric field was observed.

An electrophoretic fluid was prepared by mixing the above particles in ratios shown in table 2 below.

TABLE 2

| Isopar G | 57.5 wt % |
|---|---|
| Polyvinyl naphthalene | 40 wt % |
| Carbon black | 1 wt % |
| Quinacridon particles | 1 wt % |
| Solsperse 17000 | 0.5 wt % |

EXAMPLE 4

Electrophoretic Fluid Containing White, Black, and Magenta Particles (2)

An electrophoretic fluid containing white, black, and magenta particles was prepared as described below. In this example, polyvinyl naphthalene was used for the white particles, titanium black was used for the black particles, and quinacridon particles were used for the magenta particles. As the titanium black, Black Titanium Oxide 13M of JEMCO Inc. was used. Microparticles of polyvinyl naphthalene were prepared by dispersion polymerization of 2-vinylnaphthalene in Isopar G (isoparaffin hydrocarbon of Exxon Mobil Corporation) using a silicone macromonomer as a dispersing agent. Polyvinyl naphthalene has good dispersion stability in Isopar G. The zeta potential indicating the amount of electric charge of the prepared microparticles was close to zero and the microparticles did not migrate in an electric field.

The titanium black was surface-modified to charge it negatively. The surface of the titanium black was modified with an amino group by silane coupling and was graft-polymerized with a lauryl group. The graft chain was charge-controlled using a surfactant. Specifically, the graft-polymerized titanium black was dispersed in Isopar G, and Solsperse 17000 (Avecia) was added as a surfactant to the dispersion. In the dispersion, the zeta potential of the titanium black was negative and migration of the titanium black in an electric field was observed.

The quinacridon particles were surface-modified to charge them positively. As the quinacridon particles, PR-122 of Dainichiseika Color & Chemicals Mfg. Co., Ltd. was used. The surfaces of the quinacridon particles were diazo-coupled with 2-vinylaniline and graft-polymerized with 2-ethylhexyl methacrylate. The graft chain was charge-controlled using a surfactant. Specifically, the graft-polymerized quinacridon particles were dispersed in Isopar G, and Solsperse 17000 (Avecia) was added as a surfactant to the dispersion. In the dispersion, the zeta potential of the quinacridon particles was positive and migration of the quinacridon particles in an electric field was observed. An electrophoretic fluid was prepared by mixing the above particles in ratios shown in table 3 below.

TABLE 3

| Isopar G | 56 wt % |
|---|---|
| Polyvinyl naphthalene | 40 wt % |
| Titanium black | 1.5 wt % |
| Quinacridon particles | 2 wt % |
| Solsperse 17000 | 0.5 wt % |

EXAMPLE 5

Electrophoretic Fluid Containing White, Black, and Magenta Particles (3)

An electrophoretic fluid containing white, black, and magenta particles was prepared as described below. In this example, polyvinyl naphthalene was used for the white particles, carbon black was used for the black particles, and Disperse Red particles were used for the magenta particles. Microparticles of polyvinyl naphthalene were prepared by dispersion polymerization of 2-vinylnaphthalene in Isopar G (isoparaffin hydrocarbon of Exxon Mobil Corporation) using a silicone macromonomer as a dispersing agent. Polyvinyl naphthalene has good dispersion stability in Isopar G. The zeta potential indicating the amount of electric charge of the prepared microparticles was close to zero and the microparticles did not migrate in an electric field.

The surfaces of the Disperse Red particles were graft-polymerized with abietic acid and carboxylic acid. The graft-polymerized Disperse Red particles showed good dispersion stability in Isopar G. After the graft polymerization, the Disperse Red particles show a negative charge characteristic because of the carboxyl group in the carboxylic acid. Actually, in Isopar G, the zeta potential of the Disperse Red particles was negative and migration of the Disperse Red particles in an electric field was observed.

The surface of the carbon black was modified by heterocoagulation of an amino-group-containing polymer. As the amino-group-containing polymer, a copolymer of dimethylaminoethyl methacrylate and a silicone macromer was used. The surface-modified carbon black showed good dispersion stability in Isopar G. The surface-modified carbon black shows a positive charge characteristic because of the amino group in the amino-group-containing polymer. Actually, in Isopar G, the zeta potential of the surface-modified carbon black was positive and migration of the carbon black in an electric field was observed. An electrophoretic fluid was prepared by mixing the above particles in ratios shown in table 4 below.

TABLE 4

| | |
|---|---|
| Isopar G | 55.5 wt % |
| Polyvinyl naphthalene | 40 wt % |
| Carbon black | 2 wt % |
| Disperse Red particles | 2 wt % |
| Solsperse 17000 | 0.5 wt % |

EXAMPLE 6

Electrophoretic Fluid Containing White, Black, and Yellow Particles

An electrophoretic fluid containing white, black, and yellow particles was prepared as described below. In this example, polyvinyl naphthalene was used for the white particles, titanium black was used for the black particles, and monoazo particles were used for the yellow particles. As the titanium black, Black Titanium Oxide 13M of JEMCO Inc. was used. Microparticles of polyvinyl naphthalene were prepared by dispersion polymerization of 2-vinylnaphthalene in Isopar G (isoparaffin hydrocarbon of Exxon Mobil Corporation) using a silicone macromonomer as a dispersing agent. Polyvinyl naphthalene has good dispersion stability in Isopar G. The zeta potential indicating the amount of electric charge of the prepared microparticles was close to zero and the microparticles did not migrate in an electric field.

The titanium black was surface-modified to charge it negatively. The surface of the titanium black was modified with an amino group by silane coupling and was graft-polymerized with a lauryl group. The graft chain was charge-controlled using a surfactant. Specifically, the graft-polymerized titanium black was dispersed in Isopar G, and Solsperse 17000 (Avecia) was added as a surfactant to the dispersion. In the dispersion, the zeta potential of the titanium black was negative and migration of the titanium black in an electric field was observed.

The monoazo particles were surface-modified to charge them positively. As the monoazo particles, PY-74 of Dainichiseika Color & Chemicals Mfg. Co., Ltd. was used. The surfaces of the monoazo particles were diazo-coupled with 2-vinylaniline and graft-polymerized with 2-ethylhexyl methacrylate. The graft chain was charge-controlled using a surfactant. Specifically, the graft-polymerized monoazo particles were dispersed in Isopar G, and Solsperse 17000 (Avecia) was added as a surfactant to the dispersion. In the dispersion, the zeta potential of the monoazo particles was positive and migration of the monoazo particles in an electric field was observed. An electrophoretic fluid was prepared by mixing the above particles in ratios shown in table 5 below.

TABLE 5

| | |
|---|---|
| Isopar G | 56 wt % |
| Polyvinyl naphthalene | 40 wt % |
| Titanium black | 1.5 wt % |
| Monoazo particles | 2 wt % |
| Solsperse 17000 | 0.5 wt % |

EXAMPLE 7

Electrophoretic Fluid Containing White, Black, and Cyan Particles

An electrophoretic fluid containing white, black, and cyan particles was prepared as described below. In this example, polyvinyl naphthalene was used for the white particles, titanium black was used for the black particles, and phthalocyanine particles were used for the cyan particles. As the titanium black, Black Titanium Oxide 13M of JEMCO Inc. was used. Microparticles of polyvinyl naphthalene were prepared by dispersion polymerization of 2-vinylnaphthalene in Isopar G (isoparaffin hydrocarbon of Exxon Mobil Corporation) using a silicone macromonomer as a dispersing agent. Polyvinyl naphthalene has good dispersion stability in Isopar G. The zeta potential indicating the amount of electric charge of the prepared microparticles was close to zero and the microparticles did not migrate in an electric field.

The titanium black was surface-modified to charge it negatively. The surface of the titanium black was modified with an amino group by silane coupling and was graft-polymerized with a lauryl group. The graft chain was charge-controlled using a surfactant. Specifically, the graft-polymerized titanium black was dispersed in Isopar G, and Solsperse 17000 (Avecia) was added as a surfactant to the dispersion. In the dispersion, the zeta potential of the titanium black was negative and migration of the titanium black in an electric field was observed.

The phthalocyanine particles were surface-modified to charge them positively. As the phthalocyanine particles, FG-7351 of Dainichiseika Color & Chemicals Mfg. Co., Ltd. was used. The surfaces of the phthalocyanine particles were diazo-coupled with 2-vinylaniline and graft-polymerized with 2-ethylhexyl methacrylate. The graft chain was charge-controlled using a surfactant. Specifically, the graft-polymerized phthalocyanine particles were dispersed in Isopar G, and Solsperse 17000 (Avecia) was added as a surfactant to the dispersion. In the dispersion, the zeta potential of the phthalocyanine particles was positive and migration of the phthalocyanine particles in an electric field was observed. An electrophoretic fluid was prepared by mixing the above particles in ratios shown in table 6 below.

TABLE 6

| | |
|---|---|
| Isopar G | 56 wt % |
| Polyvinyl naphthalene | 40 wt % |
| Carbon black | 1.5 wt % |
| Phthalocyanine particles | 2 wt % |
| Solsperse 17000 | 0.5 wt % |

EXAMPLE 8

Electrophoretic Display Device Capable of Displaying White, Black, and Magenta

Microcapsules containing the electrophoretic fluid of Example 3, 4, or 5 are prepared. The microcapsules are prepared by coacervation of gelatin-gum arabic. The sizes of the microcapsules are adjusted to between 40 and 50 μm by separation. Then, the second and third electrodes are formed on a PET film. The pairs of the second and third electrodes are arranged in a hexagonal close-packed array with a pitch of 60 μm between them. An adhesive is applied to the second and third electrodes, and a screen having meshes arranged in a hexagonal close-packed array and corresponding to the pairs of the second and third electrodes is placed on the PET film such that the meshes are aligned with the pairs of the second and third electrodes. The microcapsules are applied to the screen and are thereby put in the meshes. After excess microcapsules are removed, the screen is removed. As a result, the microcapsules remain on the corresponding pairs of electrodes. Then, an adhesive is applied to the microcapsules, and a PET film on which an ITO electrode is formed is bonded to the microcapsules. As a result, an electrophoretic display device capable of displaying three colors is produced. When bonding the PET film to the microcapsules, it is preferable to apply pressure to the PET film to an extent that the microcapsules are not damaged. This makes it possible to eliminate gaps between the microcapsules.

When microcapsules containing the electrophoretic fluid of Example 3 or 4 are used, electrophoretic display elements of the produced electrophoretic display device display magenta when a voltage of +15 V is applied to the second and third electrodes relative to the ITO electrode, display black when a voltage of −15 V is applied to the second and third electrodes, and display white when a voltage of +10 V is applied to the second electrodes and a voltage of −10 V is applied to the third electrodes. When microcapsules containing the electrophoretic fluid of Example 5 are used, electrophoretic display elements of the produced electrophoretic display device display magenta when a voltage of −15 V is applied to the second and third electrodes relative to the ITO electrode, display black when a voltage of +15 V is applied to the second and third electrodes, and display white when a voltage of +10 V is applied to the second electrodes and a voltage of −10 V is applied to the third electrodes.

EXAMPLE 9

Electrophoretic Display Device Capable of displaying Multiple Colors

Pairs of the second and third electrodes are formed on a PET film. The pairs of the second and third electrodes are arranged in a hexagonal close-packed array with a pitch of 100 µm between them. A protective film is formed over the second and third electrodes. Then, cells are formed in positions corresponding to the pairs of the second and third electrodes using a photoresist. As the photoresist, SU-8 (Kayaku Microchem Co., Ltd) may be used. The thickness of walls between the cells is preferably between 10 and 15 µm, and the height of the walls is preferably between 40 and 50 µm. The electrophoretic fluids of Examples 4, 6, and 7 are injected into the corresponding cells. For example, the electrophoretic fluids are injected into the cells using inkjet nozzles such that the resulting electrophoretic display elements are arranged as shown in FIG. 5. A sealing film is formed over the electrophoretic fluids to prevent the liquids from drying. As the sealing film, a gelatin resin that is not soluble in the electrophoretic fluids may be used. A polyoxyethylene surfactant may be added to the gelatin resin to reduce the surface tension with the electrophoretic fluids. After being heated to about 40° C., the gelatin resin is applied over the electrophoretic fluids using a slit coater and is then dried to form the sealing film. Next, an adhesive is applied to the sealing film, and a PET film on which an ITO electrode is formed is bonded to the sealing film. As a result, an electrophoretic display device capable of displaying multiple colors is produced. Electrophoretic display elements of the produced electrophoretic display device display magenta, yellow, or cyan when a voltage of +15 V is applied to the second and third electrodes, display black when a voltage of −15 V is applied to the second and third electrodes, and display white when a voltage of +10 V is applied to the second electrodes and a voltage of −10 V is applied to the third electrodes.

An embodiment of the present invention provides an electrophoretic display element capable of displaying three colors and having an excellent reflectance and contrast. Another embodiment of the present invention provides an electrophoretic fluid and an electrophoretic display medium containing the electrophoretic fluid that are used for the electrophoretic display element. Still another embodiment of the present invention provides an electrophoretic display device comprising the electrophoretic display elements, a display method using the electrophoretic display element, and methods of producing the electrophoretic display element and the electrophoretic display device.

An aspect of the present invention provides a method of producing an electrophoretic display element. The method includes the steps of preparing an electrophoretic fluid by dispersing first, second, and third dispersible particles having different optical properties in a solvent, the first dispersible particles being uncharged, the second dispersible particles being positively charged electrophoretic particles, and the third dispersible particles being negatively charged electrophoretic particles; placing a pair of electrodes separated from each other on an insulating substrate; forming a sheet with a photoresist on a surface of the insulating substrate on which the pair of the electrodes are placed, the sheet having an opening that exposes the pair of the electrodes; filling the opening of the sheet with the electrophoretic fluid; forming a coating over the opening filled with the electrophoretic fluid; and placing a transparent electrode on the coating over the opening.

Another aspect of the present invention provides a method of producing an electrophoretic display element. The method includes the steps of preparing an electrophoretic fluid by dispersing first, second, and third dispersible particles having different optical properties in a solvent, the first dispersible particles being uncharged, the second dispersible particles being positively charged electrophoretic particles, and the third dispersible particles being negatively charged electrophoretic particles; encapsulating the electrophoretic fluid in a microcapsule used as an electrophoretic display medium; placing a pair of electrodes separated from each other on an insulating substrate; covering a surface of the insulating substrate on which the pair of the electrodes are placed with a sheet having an opening that exposes the pair of the electrodes; placing the microcapsule on the insulating substrate through the opening of the sheet; and placing a transparent electrode on the microcapsule placed on the insulating substrate.

Another aspect of the present invention provides a method of producing an electrophoretic display device. The method includes the steps of preparing an electrophoretic fluid by dispersing first, second, and third dispersible particles having different optical properties in a solvent, the first dispersible particles being uncharged, the second dispersible particles being positively charged electrophoretic particles, and the third dispersible particles being negatively charged electrophoretic particles; placing pairs of electrodes separated from each other on an insulating substrate; forming a sheet with a photoresist on a surface of the insulating substrate on which the pairs of the electrodes are placed, the sheet having openings that expose the corresponding pairs of the electrodes; filling the openings of the sheet with the electrophoretic fluid; forming a coating over the openings filled with the electrophoretic fluid; and placing a transparent electrode on the coating over the openings.

Another aspect of the present invention provides a method of producing an electrophoretic display device. The method includes the steps of preparing an electrophoretic fluid by dispersing first, second, and third dispersible particles having different optical properties in a solvent, the first dispersible particles being uncharged, the second dispersible particles being positively charged electrophoretic particles, and the third dispersible particles being negatively charged electrophoretic particles; encapsulating the electrophoretic fluid in microcapsules used as electrophoretic display media; placing pairs of electrodes separated from each other on an insulating substrate; covering a surface of the insulating substrate on which the pairs of the electrodes are placed with a sheet having openings that expose the corresponding pairs of the electrodes; placing the microcapsules on the insulating substrate through the openings of the sheet; and placing a transparent electrode on the microcapsules placed on the insulating substrate.

Still another aspect of the present invention provides a method of producing an electrophoretic display device. The method includes a first step of preparing an electrophoretic fluid by dispersing first, second, and third dispersible particles having different optical properties in a solvent and preparing first electrophoretic media by encapsulating the electrophoretic fluid in microcapsules, the first dispersible particles being uncharged, the second dispersible particles being positively charged electrophoretic particles, and the third dispersible particles being negatively charged electrophoretic particles; a second step of placing pairs of electrodes separated from each other on an insulating substrate; a third step of covering a surface of the insulating substrate on which the pairs of the electrodes are placed with a first sheet having openings that, respectively, expose a first set of the pairs of the electrodes; a fourth step of placing the first electrophoretic media on the insulating substrate through the openings of the first sheet; a fifth step of removing the first sheet from the insulating substrate; a sixth step of preparing second electrophoretic media as in the first step using fourth dispersible particles instead of the first, second, or third dispersible particles, the fourth dispersible particles having an optical property that is different from the optical properties of the first, second, and third dispersible particles; a seventh step of covering the surface of the insulating substrate with a second sheet having openings that, respectively, expose a second set of the pairs of the electrodes on which the first electrophoretic media are not placed; an eighth step of placing the second electrophoretic media on the insulating substrate through the openings of the second sheet; a ninth step of removing the second sheet from the insulating substrate; and a tenth step of placing a transparent electrode on the first and second electrophoretic media placed on the insulating substrate.

The present invention is not limited to the specifically disclosed embodiments, and variations and modifications may be made without departing from the scope of the present invention.

The present application is based on Japanese Priority Application No. 2007-147358 filed on Jun. 1, 2007, and Japanese Priority Application No. 2008-027920 filed on Feb. 7, 2008, the entire contents of which are hereby incorporated herein by reference.

The invention claimed is:

1. An electrophoretic display device, comprising:
a plurality of electrophoretic display elements which comprises:
an electrophoretic display medium having a hollow structure containing an electrophoretic fluid that includes
a solvent, and
first, second, and third dispersible particles having different optical properties and dispersed in the solvent, the first dispersible particles being uncharged, the second dispersible particles being positively-charged electrophoretic particles, and the third dispersible particles being negatively-charged electrophoretic particles;
a transparent first electrode; and
second and third electrodes facing the first electrode across the electrophoretic display medium,
wherein the electrophoretic display elements are arranged such that the first electrodes face substantially the same direction, and
wherein at least one of the first, second, and third dispersible particles in the electrophoretic fluid contained in the electrophoretic display medium of any one of the electrophoretic display elements have an optical property that is different from the optical properties of the first, second, and third dispersible particles in the electrophoretic fluid contained in the electrophoretic display medium of an adjacent one of the electrophoretic display elements.

2. The electrophoretic display device as claimed in claim 1, wherein the electrophoretic display elements are arranged in a tetragonal lattice or a hexagonal close-packed array.

3. The electrophoretic display device as claimed in claim 1, wherein the electrophoretic fluid contained in the electrophoretic display medium of each of the electrophoretic display elements includes white, black, and yellow dispersible particles; white, black, and magenta dispersible particles; or white, black, and cyan dispersible particles.

4. The electrophoretic display device as claimed in claim 3, wherein the first dispersible particles are white, the second dispersible particles are yellow, magenta, or cyan, and the third dispersible particles are black.

5. The electrophoretic display device as claimed in claim 3, wherein the first dispersible particles are white, the second dispersible particles are black, and the third dispersible particles are yellow, magenta, or cyan.

6. The electrophoretic display device as claimed in claim 3, wherein the white dispersible particles are polymer particles.

7. A display method of an electrophoretic display element that includes
an electrophoretic display medium having a hollow structure containing an electrophoretic fluid including a solvent, and first, second, and third dispersible particles having different optical properties and dispersed in the solvent, the first dispersible particles being uncharged, the second dispersible particles being positively-charged electrophoretic particles, and the third dispersible particles being negatively-charged electrophoretic particles;
a transparent first electrode; and
second and third electrodes facing the first electrode across the electrophoretic display medium,
the display method comprising the steps of:
applying a voltage between the first and second electrodes and/or between the first and third electrodes in order that the second dispersible particles or the third dispersible particles accumulate at the transparent first electrode in the electrophoretic display medium and become observable through the transparent first electrode; and
applying a voltage between the second and third electrodes to accumulate the second and third dispersible particles at the second and third electrodes in the electrophoretic display medium and thereby to make the first dispersible particles observable through the transparent first electrode.

8. The method of claim 7, wherein the electrophoretic display elements are arranged in a tetragonal lattice or a hexagonal close-packed array.

9. The method of claim 7, wherein the electrophoretic fluid contained in the electrophoretic display medium of each of the electrophoretic display elements includes white, black, and yellow dispersible particles; white, black, and magenta dispersible particles; or white, black, and cyan dispersible particles.

10. The method of claim 9, wherein the first dispersible particles are white, the second dispersible particles are yellow, magenta, or cyan, and the third dispersible particles are black.

11. The method of claim 9, wherein the first dispersible particles are white, the second dispersible particles are black, and the third dispersible particles are yellow, magenta, or cyan.

12. The method of claim 9, wherein the white dispersible particles are polymer particles.

13. An electrophoretic display device, comprising:
   a plurality of electrophoretic display elements which comprises:
   an electrophoretic display medium having a hollow structure containing an electrophoretic fluid that includes first, second, and third dispersible particles having different optical properties and dispersed in the display medium, the first dispersible particles being uncharged, the second dispersible particles being positively-charged electrophoretic particles, and the third dispersible particles being negatively-charged electrophoretic particles;
   a transparent first electrode; and
   second and third electrodes facing the first electrode across the electrophoretic display medium,
   wherein the electrophoretic display elements are arranged such that the first electrodes face substantially the same direction, and
   wherein at least one of the first, second, and third dispersible particles in the electrophoretic fluid contained in the electrophoretic display medium of any one of the electrophoretic display elements have an optical property that is different from the optical properties of the first, second, and third dispersible particles in the electrophoretic fluid contained in the electrophoretic display medium of an adjacent one of the electrophoretic display elements.

14. The device of claim 13, wherein the electrophoretic display elements are arranged in a tetragonal lattice or a hexagonal close-packed array.

15. The device of claim 13, wherein the electrophoretic fluid contained in the electrophoretic display medium of each of the electrophoretic display elements includes white, black, and yellow dispersible particles; white, black, and magenta dispersible particles; or white, black, and cyan dispersible particles.

16. The device of claim 15, wherein the first dispersible particles are white, the second dispersible particles are yellow, magenta, or cyan, and the third dispersible particles are black.

17. The device of claim 15, wherein the first dispersible particles are white, the second dispersible particles are black, and the third dispersible particles are yellow, magenta, or cyan.

18. The device of claim 15, wherein the white dispersible particles are polymer particles.

* * * * *